United States Patent [19]

Lee

[11] Patent Number: 5,771,128
[45] Date of Patent: Jun. 23, 1998

[54] EDIT RECORDING METHOD AND APPARATUS USING ERASE HEAD CONTROL

[75] Inventor: Seung-hong Lee, Suwon, Rep. of Korea

[73] Assignee: Samsung Electronics Co., Ltd., Kyungki-Do, Rep. of Korea

[21] Appl. No.: 556,086

[22] Filed: Nov. 9, 1995

[30] Foreign Application Priority Data

Nov. 11, 1994 [KR] Rep. of Korea .................. 94-29646

[51] Int. Cl.⁶ .................. G11B 5/02; G11B 27/02; G11B 27/00; G11B 5/127
[52] U.S. Cl. .................. 360/57; 360/13; 360/178; 386/54; 386/63
[58] Field of Search .................. 360/13, 57, 84, 360/85, 118; 386/4, 54, 63

[56] References Cited

U.S. PATENT DOCUMENTS

| 4,573,090 | 2/1986 | Tsuchiya | 360/74.1 |
|---|---|---|---|
| 4,819,087 | 4/1989 | Takeuchi et al. | 360/13 |
| 5,299,072 | 3/1994 | Gotoh et al. | 360/57 |

Primary Examiner—Aristotelis M. Psitos
Assistant Examiner—Regina Y. Neal
Attorney, Agent, or Firm—Sughrue, Mion, Zinn, Macpeak & Seas, PLLC

[57] ABSTRACT

An edit recording method and apparatus using erase head control is provided in which connection portions between programs are edited and recorded in a manner which prevents the erasure of a recorded end portion between a full erase head and a video head when a program having different contents is additionally edited on a recorded tape. An erase operation is stopped by relatively controlling full erase head according to an interval to enable a dubbing operation to be performed for a predetermined time.

9 Claims, 5 Drawing Sheets

EDIT RECORDING METHOD AND APPARATUS USING ERASE HEAD CONTROL

BACKGROUND OF THE INVENTION

The present invention relates to an edit recording method and apparatus using erase head control in which portions between programs are edited and recorded in a manner which prevents a recorded end portion from being erased between a full erase head and a video head when a program having different contents is additionally edited on a recorded tape.

A conventional video cassette recorder (VCR) system has a full erase head, a video head and an audio/control head which are differently positioned in terms of a tape running structure.

FIGS. 1A and 1B show a structure representing a tape running state in a general VCR system, in which FIG. 1A is a plan view of a tape running mechanism, and FIG. 1B is a side view thereof. In FIGS. 1A and 1B, reference numeral 1 designates a tension pole which pulls tape 2 to maintain a constant tension when tape 2 runs at the state where tape 2 is wound in a slant around drum 3. Reference numeral 4 designates a full erase head which erases recorded contents in advance before a signal is recorded on tape 2. A supply guide roller 5 and a take-up guide roller 6 are installed on both sides of drum 3 in order to guide tape 2 to prevent that portion of tape 2 which is located at entrance/exit sides of drum 3 from being twisted and to enable tape 2 to run along the surface of drum 3.

Drum 3 is provided with video heads 7 for recording/reproducing a video signal. An audio/control head 8 is installed in a position spaced sightly apart from take-up guide roller 6, in order to record/reproduce an audio signal and a control signal. A capstan motor shaft 9 and a pinch roller 10 are installed beside audio/control head 8 while interposing tape 2. As a capstan motor (not shown) and pinch roller 10 rotate, tape 2 runs at a constant speed. Reference numeral 11 designates a review arm for maintaining a constant tension when tape 2 runs.

In a VCR system having the above-described structure, if drum 3 and the capstan motor are caused to rotate at a constant speed by a servo circuit (not shown), tape 2 passes through capstan motor shaft 9 and pinch roller 10 and runs at a constant speed during recording and reproducing.

In a recording mode, full erase head 4 erases all signals which have been recorded, and video heads 7 record video signals on tape 2. Thereafter, an audio signal and a control signal are recorded by audio/control head 8.

In the above recording mode, all operations such as an erase operation of full erase head 4, a video recording operation of video heads 7 and an audio and control signal recording operation of audio/control head 8, are performed substantially simultaneously.

Thus, when reproducing a tape on which signals are recorded, a video signal and an audio signal to be watched are recorded in different positions of the tape.

Meanwhile, it is assumed that an additional program having different contents are edited and recorded on a portion of a tape on which some signals have been already recorded and such editing and recording operation are stopped. In an interval of tape between portions A–B of FIG. 1A, recorded signals are completely erased by full erase head 4. Also, in an interval of tape between portions B–C, a video signal is recorded by video head 7, but a control signal which is a control reference signal for a capstan motor during reproducing and an audio signal are not recorded yet.

Thus, assuming that additional contents of the program are edited on the tape on which signals have been already recorded, there is no picture in interval A–C or a picture is reproduced at a swinging state for a considerable time during reproduction after editing. As a result, the additional edited picture is not connected with a previously recorded picture.

SUMMARY OF THE INVENTION

Therefore, to solve the above problem, it is an object of the present invention to provide an edit recording method and apparatus using erase head control, in which a full erase head selectively operates on an interval-by-interval basis, and accordingly an erase phenomenon that signals corresponding to a distance between a full erase head and an audio/control head are erased can be prevented although additional contents are edited on the recorded tape.

Another object of the present invention is to provide an edit recording method and apparatus in which a length of a tape between a full erase head and an audio/control head is converted into a coefficient with respect to a recording/reproduction speed, a converted coefficient is programmed in a controller, and a switching operation of the full erase head is performed by the controller, thereby accomplishing a clear picture connection during dubbing.

To accomplish the above object of the present invention, there is provided an edit recording apparatus using erase head control comprising a controller for outputting a full erase head control signal to stop a full erase head operation and then controlling a dubbing operation for a predetermined time on the basis of respective tape speeds, when a recording and edit recording mode is changed to a stop mode. A switching portion is connected to the output end of the controller. Accordingly, the erase signal generated from an erase signal generator according to the full erase head control signal is transmitted to the full erase head or interrupted for a predetermined interval. Meanwhile, the switching portion is replaced by a full erase signal generator, which operates according to the full erase head control signal of the controller apart from the conventional erase signal generator to output the erase signal to the full erase head.

Also, the other object of the present invention can be accomplished by providing an edit recording method using erase head control comprising the steps of:

judging whether a stop key is pressed during recording or whether a present point of time is a last recording point of time using a counter or a timer;

stopping an erase operation of a full erase head when the stop key has been pressed or the present point of time is the last recording point of time using the counter or the timer; and performing a dubbing operation for a predetermined time after judging a recording/reproduction speed is a standard play (SP) mode or a super long play (SLP) mode and then performing a stop operation.

BRIEF DESCRIPTION OF THE DRAWINGS

The preferred embodiments are described with reference to the drawings wherein.

DETAILED DESCRIPTION OF THE PREFERRED EMBODIMENT

A preferred embodiment of the present invention will be described below in more detail with reference to the accompanying drawings FIGS. 2 through 6.

Figure 1A:
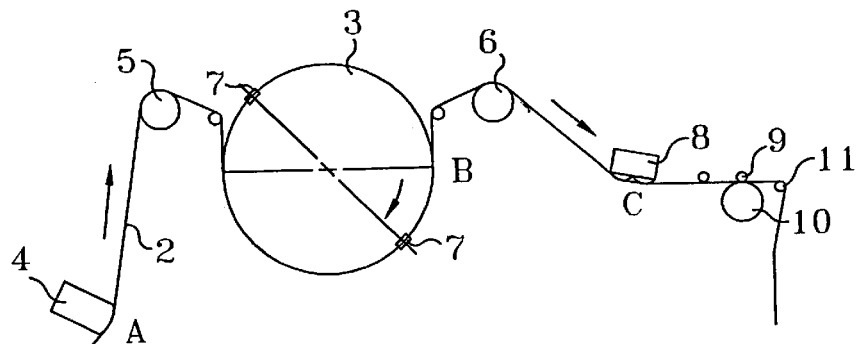
FIGS. 1A and 1B are plan and side views of a structure showing a tape running state in a general VCR system, respectively.
Figure 1B:
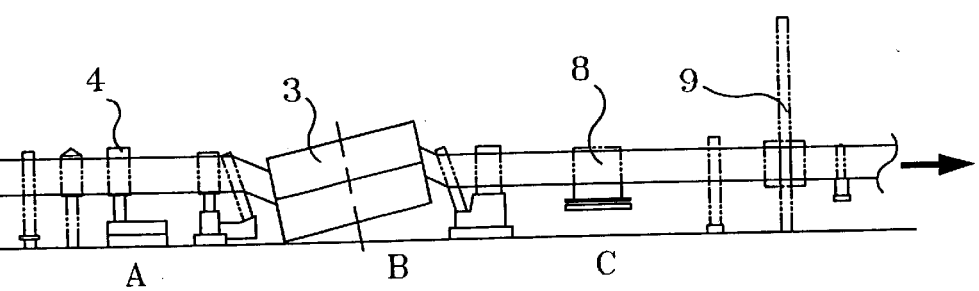
Figure 2:
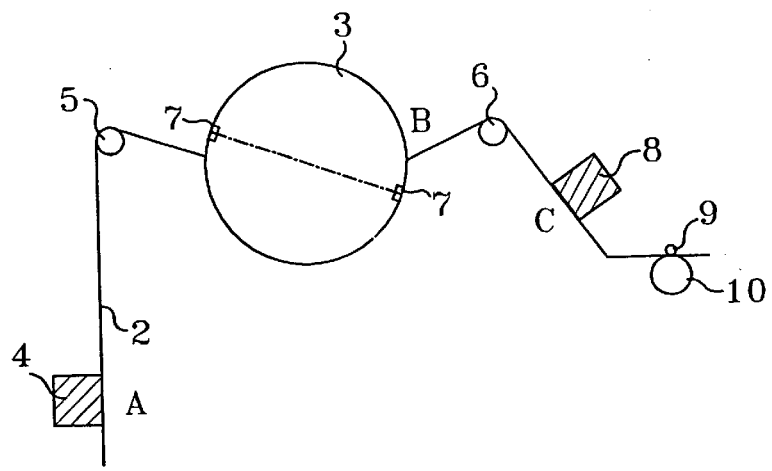
FIG. 2 shows a structure showing a tape running state at a recording operation.

FIG. 2 shows a structure of a tape running state at a recording operation, in which each component has the same reference numeral as that of a VCR system shown in FIG. 1A.

Figure 3:
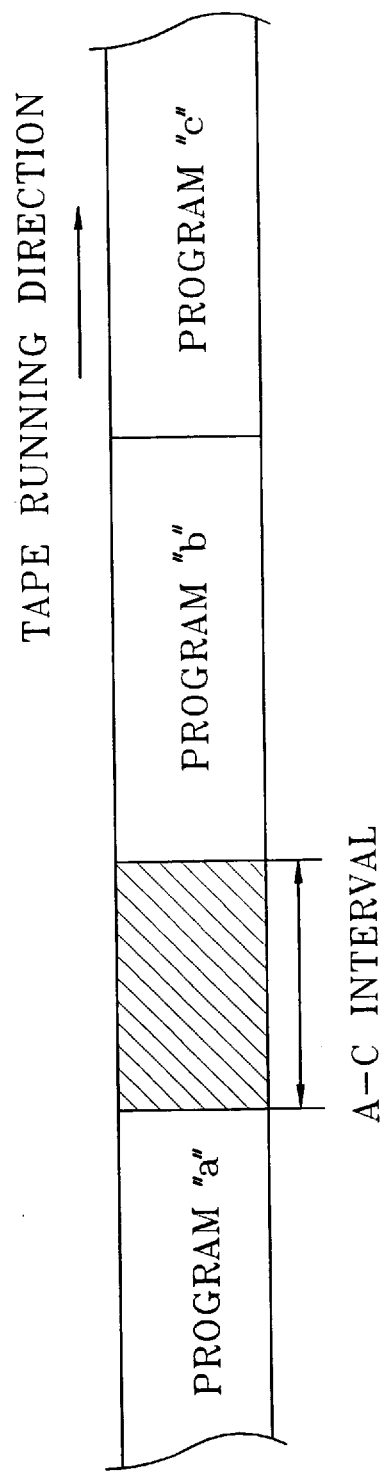
FIG. 3 shows a tape state indicative of a blank interval generated when another program is dubbed on a tape on which a program is recorded.

FIG. 3 shows a blank interval corresponding to intervals of portions A through C of FIG. 2 generated when a program "b" is dubbed on a portion of a tape on which a program "a" has been already recorded. In FIG. 2, an interval of portions A–B is a non-recording interval and an erased interval and an interval of portions B–C is an interval on which a video signal only is recorded and an audio and a control signal are not recorded.

An actual tape length of the above interval A through C is approximately 250 mm in which there is a small difference between deck mechanisms. An interval of approximately eight seconds is generated in a reproduction operation at an SP mode while an interval of about twenty-four seconds is generated in a reproduction operation at an SLP mode.

It is possible to remove the above blank interval, by performing a dubbing operation in correspondence to intervals of portions A through C at the state where a full erase head does not operate when a recording mode is changed into a stop mode. That is, when a stop operation is performed from a general recording mode, a dubbing operation is performed for a predetermined time (for example, eight seconds or twenty-four seconds) at a respective speed (for example, 33.35 mm/sec in the Sp mode or 11.11 mm/sec in the SLP mode), and then a stop operation is performed.

Also, when a total length of the program to be edited can be seen by using a counter function from beginning to end of the program, an operation of the full erase head is stopped before eight seconds in the SP mode or twenty-four seconds in the SLP mode and then a dubbing operation is performed. Since a recording end time can be seen when a reserve recording operation is performed by using a timer, the same method as the above-described procedure is performed.

Figure 4:
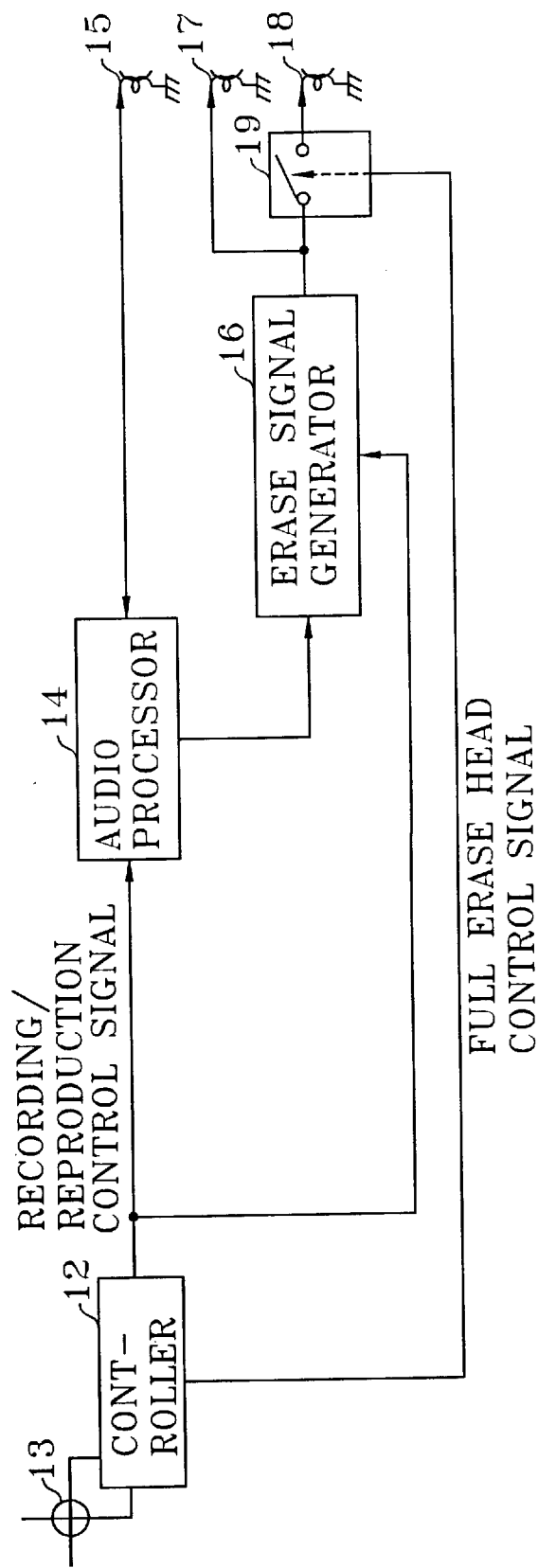
FIG. 4 is a block diagram of an edit recording apparatus using erase head control according to a preferred embodiment of the present invention.

FIG. 4 is a block diagram of an edit recording apparatus using erase head control according to a preferred embodiment of the present invention. The FIG. 4 apparatus includes a controller 12 which controls an entire operation of a VCR system and outputs a full erase head control signal to stop a full erase head operation when a recoding mode is changed to a stop mode, so that a dubbing operation is performed for a predetermined time.

A key input portion is connected to controller 12. The key input portion includes a key 13 for commanding a counter function to check a recording amount during an edit recording operation.

An audio processor 14 is connected to the output end of controller 12. Audio processor 14 processes an audio signal to be recorded according to a recording/reproduction control signal output from controller 12, and then outputs the processed signal to an audio head 15 or receives an audio signal reproduced by audio head 15. An erase signal generator 16 which is connected to the output end of audio processor 14, receives a recording/reproduction control signal of controller 12 and the output signal of audio processor 14 and then outputs an erase signal for erasing the recorded contents on the tape to an audio erase head 17 and full erase head 18, respectively, has the same constitution and operation as those of the conventional VCR system.

A characteristic portion of the present invention is a switching portion 19 in which an erase signal output from an erase signal generator 16 is transmitted to full erase head 18 or interrupted for a predetermined interval of time, according to the full erase head control signal output from controller 12.

When an additional program having different contents is edited on a portion of the recorded tape, controller 12 outputs a full erase head control signal. At this time, since switching portion 19 is not turned off by the full erase head control signal, the erase signal is not transmitted to full erase head 18 and then full erase head 18 stops an erase operation. Thereafter, a dubbing operation is performed for eight seconds in the SP mode while a dubbing operation is performed for twenty-four seconds in the SLP mode. Here, video heads, audio head 15 and audio erase head 17 operate at the recording mode.

Figure 5:
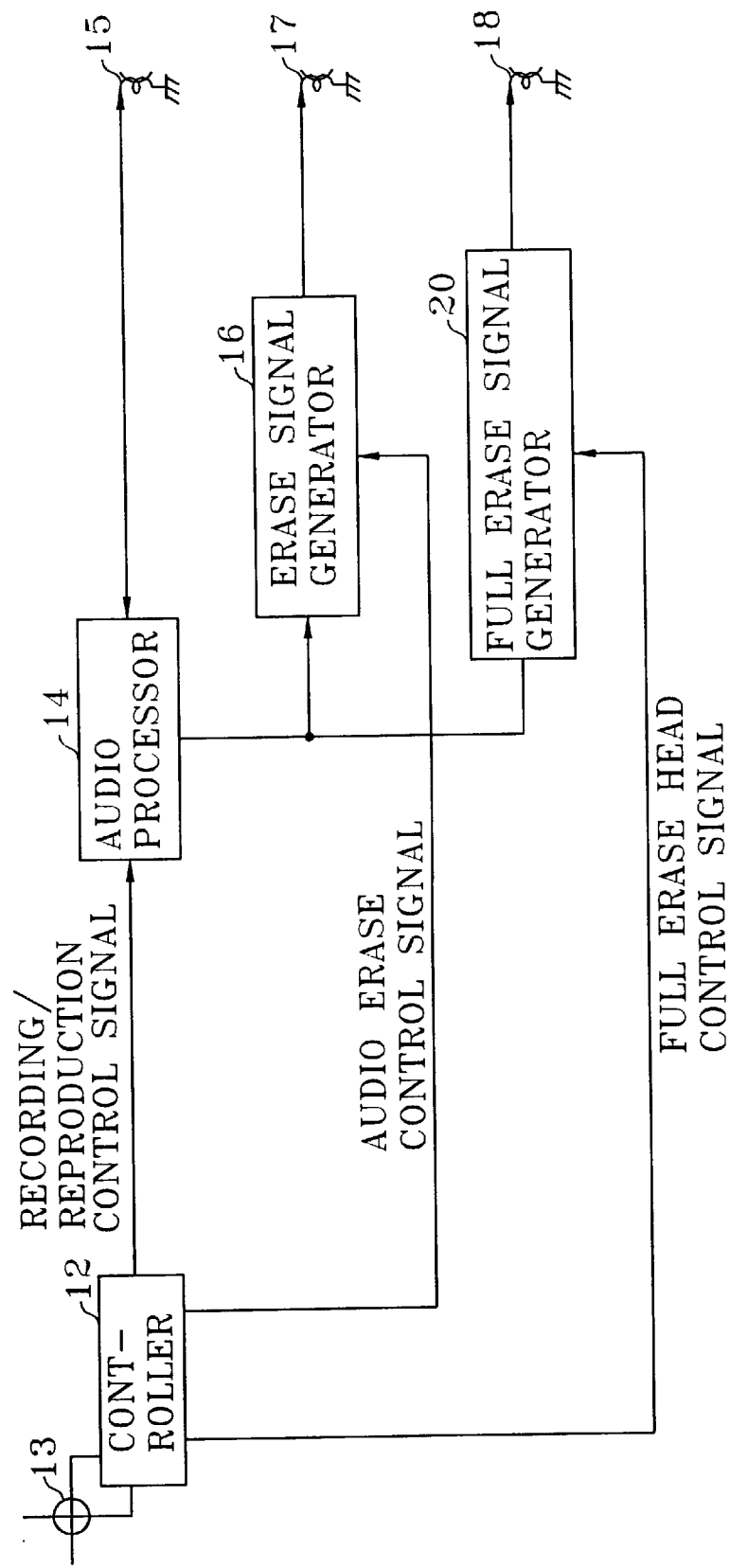
FIG. 5 is a block diagram of an edit recording apparatus using erase head control according to another preferred embodiment of the present invention.

FIG. 5 is a block diagram of an edit recording apparatus using erase head control according to another preferred embodiment of the present invention. In the FIG. 5 apparatus, the same components as those of the circuit of the first embodiment, that is, controller 12, key input portion 13, audio processor 14, erase signal generator 16, audio head 15, audio erase head 17 and full erase head 18 have the same constitution and operation as those of the embodiment of FIG. 4. In the embodiment of FIG. 5, a full erase signal generator 20 is added in place of switching portion 19 of FIG. 4. Accordingly, an erase signal for erasing the recorded contents on the tape according to the full erase head control signal of controller 12 and the output signal of audio processor 14, is output to full erase head 18.

Here, erase signal generator 16 receives an audio erase control signal output from controller 12 and the output signal of audio processor 14 and outputs an erase signal for erasing an audio signal recorded on the tape to audio erase head 17.

When an additional program is edited and recorded on the recorded tape and then stopped, controller 12 outputs an audio erase control signal to erase signal generator 16 to enable audio erase head 17 to operate in a recording mode. Moreover, a full erase head control signal is output to erase signal generator 20 so that the erase signal is not applied to full erase head 18. If an erase operation of full erase head 18 is stopped, a video and audio head operates in the recording mode to perform a dubbing operation.

Figure 6:
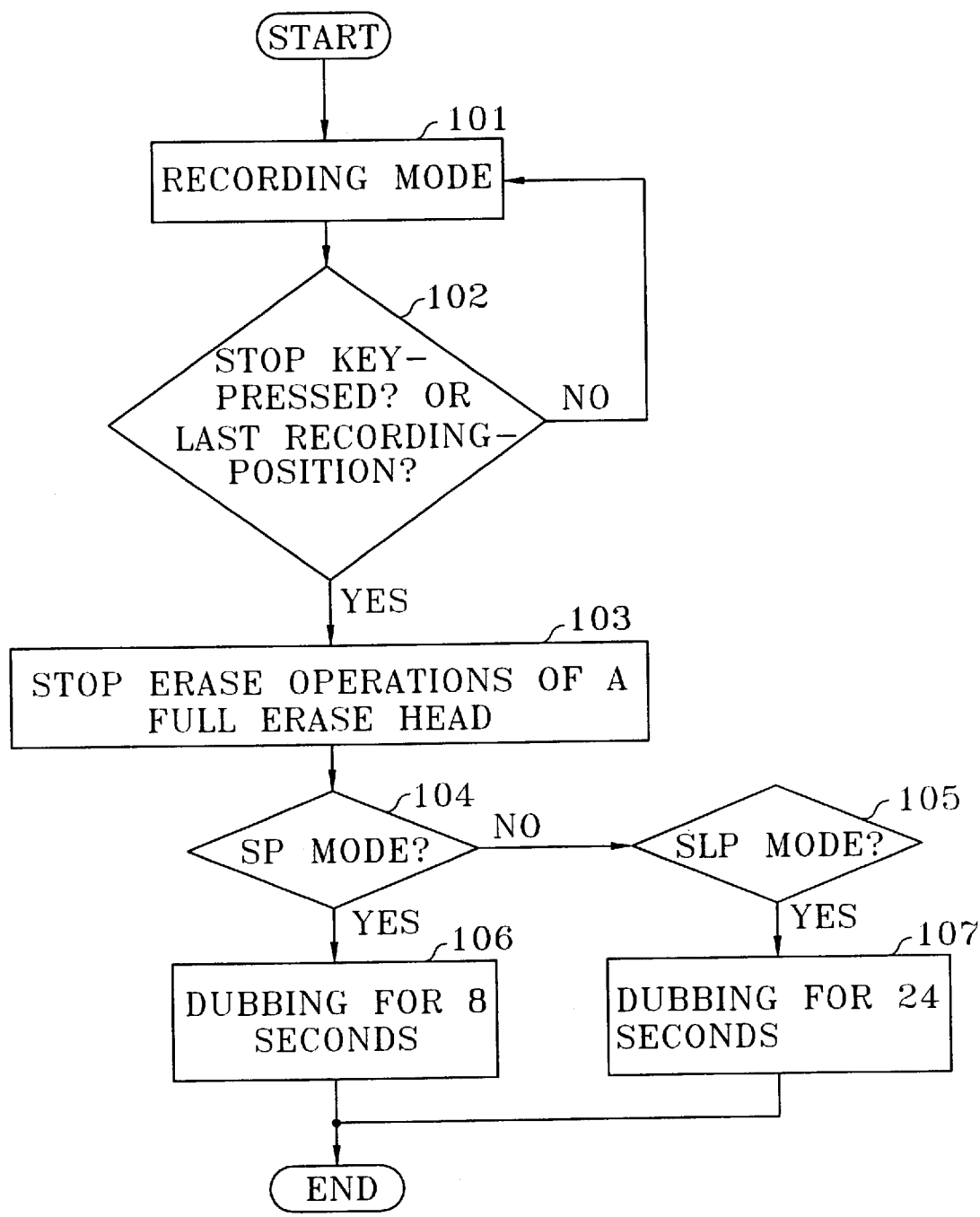
FIG. 6 is a flow-chart diagram for explaining an operation of a controller.

FIG. 6 is a flow-chart diagram for explaining an operation of the above-described controller. Firstly, in step 102 controller 12 judges whether a stop key from a recording mode determined in step 101 is pressed or the present point of time is a last recording point of time using a counter or a timer. When the stop key is not pressed or it is not a last recording point of time according to a counter or a timer, a recording mode is continuously performed after returning to step 101.

If the stop key is pressed, or the present point of time is a last recording point of time, an erase operation by a full erase head is stopped in step 103. Here, since a switching operation 19 is turned off by a full erase head control signal in FIG. 4, an erase signal for full erase head 18 is interrupted. In the apparatus of FIG. 5, since an erase signal is not generated from erase signal generator 20 by the full erase head control signal, full erase head 18 stops an erase operation.

Then, after judging whether the present mode is an SP mode in step 104, a dubbing operation is performed for a predetermined time, for example, eight seconds in case of the SP mode in step 106, whereby the operation is completed. When it is determined to be not the SP mode in step 104, it is judged whether the present mode is an SLP mode in step 105. In case of the SLP mode, a dubbing operation is performed for a predetermined time, for example, twenty-four seconds in step 107 whereby the operation is completed. Here, a dubbing operation performance time, for example, eight seconds or twenty-four seconds is preset by converting a tape length between the full erase head and the audio/control head into a coefficient corresponding to a recording/reproduction speed such as the SP or SLP mode.

As described above, the present invention converts a length of a tape between a full erase head and an audio/control head into a coefficient with respect to a recording/reproduction speed, in which a converted coefficient is programmed in a controller, and a full erase head selectively operates on an interval-by-interval basis. Accordingly, an erase phenomenon wherein signals corresponding to a distance between a full erase head and an audio/control head are erased can be prevented although additional contents are edited on the recorded tape, and a clear picture connection during dubbing can be accomplished.

While only certain embodiments of the invention have been specifically described herein, it will apparent that numerous modifications may be made thereto without departing from the spirit and scope of the invention.

What is claimed is:

1. An edit recording apparatus using erase head control for a recording and reproduction system which records/reproduces video and audio signals and performs an erase operation by an audio erase head and a full erase head during an edit recording operation, said edit recording apparatus comprising:
   a controller for outputting, immediately after a recording mode is changed to a stop mode, a full erase head control signal to stop a full erase head operation and then controlling a dubbing operation for a predetermined time on the basis of respective tape speeds, and for outputting a recording/reproduction control signal;
   an audio processor for processing an audio signal and outputting an output signal;
   an erase signal generator for generating an erase signal according to the recording/reproduction control signal from said controller and the output signal output from said audio processor; and
   a switching portion for transmitting the erase signal generated from the erase signal generator to a full erase head and interrupting the erase signal for a predetermined interval.

2. The edit recording apparatus according to claim 1, wherein the predetermined dubbing time of said controller is a time which it takes a tape to travel from the full erase head to an audio/control head according to a respective tape speed in the video cassette recorder.

3. The edit recording apparatus according to claim 2, wherein when said controller judges a last recording position of a program to be edited by using a counter function, an operation of the full erase head is stopped and then a dubbing operation is performed for the predetermined time on the basis of respective tape speeds.

4. An edit recording apparatus using erase head control for a recording and reproduction system which records/reproduces video and audio signals and performs an erase operation by an audio erase head and a full erase head during an edit recording operation, said edit recording apparatus comprising:
   a controller for outputting, immediately after a recording mode is changed to a stop mode, a full erase head control signal to stop a full erase head operation for a predetermined time and then controlling a dubbing operation for said predetermined time on the basis of respective tape speeds, for outputting an audio erase control signal, and for outputting a recording/reproduction control signal;
   an audio processor for processing an audio signal and outputting an output signal;
   an erase signal generator for generating an erase signal according to the recording/reproduction control signal from said controller; wherein said erase signal generator outputs an erase signal to an audio erase head according to the audio erase control signal of said controller and the output signal output by said audio processor; and
   a full erase signal generator for outputting an erase signal to the full erase head to cause the full erase head to erase contents recorded on a tape according to the full erase head control signal of said controller and the output signal of the audio processor.

5. The edit recording apparatus using erase head control according to claim 4, wherein the predetermined dubbing time of said controller is a time which it takes the tape to travel from the full erase head to an audio/control head according to a respective tape speed in the video cassette recorder.

6. The edit recording apparatus using erase head control according to claim 5, wherein when said controller judges a last recording position of a program to be edited by using a counter function, an operation of the full erase head is stopped after which a dubbing operation is performed on the basis of respective tape speeds and then performing a stop operation.

7. An edit recording method using erase head control in which video and audio signals are recorded/reproduced, contents recorded on a tape are erased by a full erase head during a recording and edit recording operation, and then a dubbing operation is performed on the erased portion, said method comprising the steps of:
   judging one of whether a stop key is pressed during recording and whether a present location of the tape is a last recording location using one of a counter and a timer;
   stopping an erase head operation of a full erase head for a predetermined time when it is judged whether one of: 1) the stop key has been pressed and 2) the present location of the tape is the last recording location of the tape by using one of the counter and the timer; and
   performing a dubbing operation for said predetermined time immediately after beginning said stopping operation, said predetermined time being selected according to a judgement of whether a recording/ reproduction speed is one of a standard play (SP) mode and a super long play (SLP) mode then performing a stop operation.

8. The edit recording method using erase head control according to claim 7, wherein the predetermined time for performing a dubbing operation is preset by converting a tape length between a full erase head and an audio/control head into a coefficient on the basis of a recording/reproduction speed.

9. The edit recording method using erase head control according to claim 8, wherein the tape length between said full erase head and said audio/control head is about 250 mm, and the predetermined time for performing the dubbing operation is about eight seconds in case of a standard play mode and about twenty-four seconds in case of a super long play mode.

* * * * *